(12) United States Patent (10) Patent No.: US 8,687,911 B2
Nikula et al. (45) Date of Patent: Apr. 1, 2014

(54) ADAPTIVE METHOD FOR PROCESSING DIGITAL IMAGES, AND AN IMAGE PROCESSING DEVICE

(75) Inventors: Jarmo Nikula, Jääli (FI); Samu Koskinen, Tampere (FI); Tero Rissa, Siivikkala (FI)

(73) Assignee: Nokia Corporation, Espoo (FI)

( * ) Notice: Subject to any disclaimer, the term of this patent is extended or adjusted under 35 U.S.C. 154(b) by 1268 days.

(21) Appl. No.: 12/459,022

(22) Filed: Jun. 24, 2009

(65) Prior Publication Data

US 2010/0328504 A1 Dec. 30, 2010

(51) Int. Cl.
*G06K 9/00* (2006.01)
*G09G 5/10* (2006.01)

(52) U.S. Cl.
USPC .................. 382/261; 382/168; 345/690

(58) Field of Classification Search
USPC ......... 382/261, 162, 164, 165, 168, 172, 173, 382/190; 345/501, 536, 561, 690; 358/3.08; 348/273
See application file for complete search history.

(56) References Cited

U.S. PATENT DOCUMENTS

| | | | | |
|---|---|---|---|---|
| 4,903,142 A | * | 2/1990 | Hasebe et al. ............... | 358/3.08 |
| 5,335,082 A | * | 8/1994 | Sable ............................. | 347/232 |
| 6,735,337 B2 | * | 5/2004 | Lee et al. ...................... | 382/220 |
| 6,856,697 B2 | * | 2/2005 | Lee et al. ...................... | 382/177 |
| 7,454,040 B2 | * | 11/2008 | Luo et al. ...................... | 382/117 |
| 7,826,097 B2 | * | 11/2010 | Sanger et al. ................. | 358/3.06 |
| 2002/0191857 A1 | | 12/2002 | Macy, Jr. | |
| 2007/0064792 A1 | | 3/2007 | Chiu et al. ............... | 375/240.03 |
| 2007/0097450 A1 | | 5/2007 | Yamamoto | |
| 2009/0147111 A1 | | 6/2009 | Litvinov et al. ............... | 348/273 |

FOREIGN PATENT DOCUMENTS

| | | |
|---|---|---|
| CN | 1190824 A | 8/1998 |
| CN | 1942897 A | 4/2007 |
| CN | 101261733 A | 9/2008 |
| EP | 0622949 | 11/1994 |
| WO | WO 84/02027 | 5/1984 |
| WO | WO 96/08928 | 3/1996 |

OTHER PUBLICATIONS

E. Fossum; "Gigapixel Digital Film Sensor (DFS) Proposal"; Nanospace Manipulation of Photos and Electrons for Nanovision Systems, The $7^{th}$ Takayanagi Kenjiro Memorial Symposium and the $2^{nd}$ International Symposium on Nanovision Science, University of Shizuoka, Hamamatsu, Japan, Oct. 25-26, 2005 (whole document).
L. Sbaiz, et al; "The Gigavision Camera", IEEE Int. Conference on Acoustics, Speech and Signal Processing (ICASSP 2009), Apr. 19-24, 2009, Taipei, Taiwan; pp. 1093-1096.

(Continued)

*Primary Examiner* — Sheela Chawan
(74) *Attorney, Agent, or Firm* — Harrington & Smith

(57) ABSTRACT

A method for providing an output image based on an input image, the method comprising determining a location of an output pixel with respect to an input image, determining values of elements of a filter array such that the effective width of the filter array depends on the density of exposed input pixels within the input image, and determining the value of the output pixel by performing a sum-of-products operation between non-zero values of the elements of the filter array and the values of input pixels of the input image located at respective positions, when the filter array is superimposed on the input image such that the center of the filter array corresponds to the location of the output pixel.

21 Claims, 12 Drawing Sheets

(56) References Cited

OTHER PUBLICATIONS

O.C. Au, et al; "Hybrid Inverse Halftoning Using Adaptive Filtering", IEEE Int. Symp. On Circuits and Systems (ISCAS'99), May 30-Jun. 2, 1999; pp. IV-259 . . . IV-262; whole document.

M. Mese, et al; "Recent Advances in Digital Halftoning and Inverse Halftoning Methods", IEEE Trans. On Circuits and Systems—I: Fundamental Theory and Applications, vol. 49, No. 2; Jun. 2002; pp. 790-805; whole document.

* cited by examiner

ADAPTIVE METHOD FOR PROCESSING DIGITAL IMAGES, AND AN IMAGE PROCESSING DEVICE

FIELD OF THE INVENTION

The invention relates to processing digital images,

BACKGROUND OF THE INVENTION

A binary image sensor may comprise e.g. more than $10^9$ individual light detectors arranged as a two-dimensional array. Each individual light detector has only two possible states: an unexposed "black" state and an exposed "white" state. Thus, an individual detector does not reproduce different shades of grey. The local brightness of an image may be determined e.g. by the local spatial density of white pixels.

The size of the individual light detectors of a binary image sensor may be smaller than the minimum size of a focal spot which can be provided by the imaging optics of a digital camera. The use of such detectors may help to avoid e.g. color aliasing problems due to color filter arrays.

However, storing or transferring binary digital images as such may be difficult or impossible due to the large data size. Several exposures and read-outs may be needed to attain a sufficient signal-to-noise ratio. The resulting image data may even be so large that storing and processing of the binary digital images becomes impractical in a digital camera, or even in a desktop computer.

SUMMARY OF THE INVENTION

According to a first aspect of the invention, there is provided a method according to claim 1.

According to a second aspect of the invention, there is provided a computer readable medium according to claim 12.

According to a third aspect of the invention, there is provided a device according to claim 14.

A method for providing an output image based on a binary input image may comprise:
- determining a location of an output pixel with respect to said input image,
- determining values of elements of a filter array such that the effective width of said filter array depends on an exposure state of a portion of an image, and
- determining the value of said output pixel by performing a sum-of-products operation between non-zero values of the elements of said filter array and the values of input pixels of the input image located at respective positions, when the filter array is superimposed on the input image such that the center of said filter array corresponds to the location of said output pixel.

In particular, the effective width of said filter array may depend on the density of white or black binary pixels within said input image.

Thus, the signal-to-noise ratio and an effective resolution of the output image may be adjusted according to the exposure of the input image.

For example, output images having an adequate signal-to-noise ratio may be provided based not only on a properly exposed input image but also based on an underexposed input image. However, the effective resolution of an output image based on an under-exposed input image may be lower than the effective resolution of an output image based on a properly exposed input image.

In an embodiment, different filter arrays may be applied at different locations of the image. For example, properly exposed portions of an input image may be processed with a narrower filter array, and underexposed portions of said input image may be processed with a wider filter array. Consequently, an optimum balance between signal-to-noise ratio and effective resolution may be obtained at each location of an image.

The data size of the input image may be e.g. 1.3 gigabits. Storing so large images may consume a lot of memory space. Transferring so large images via data transmission paths may be slow. Processing so large images may be slow and/or may consume a lot of data processing capacity. Displaying so large images may be difficult or even impossible. Thanks to the invention, image data may be compressed so as to facilitate storing, transferring and/or processing of the captured images. Thanks to the invention, sufficient image resolution and a sufficient signal-to-noise ratio may be guaranteed also when portions of the input image are underexposed and/or overexposed.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which FIG. 7b shows, in a three dimensional view, the values of the elements of a filter array of FIG. 7a

DETAILED DESCRIPTION

Figure 1:
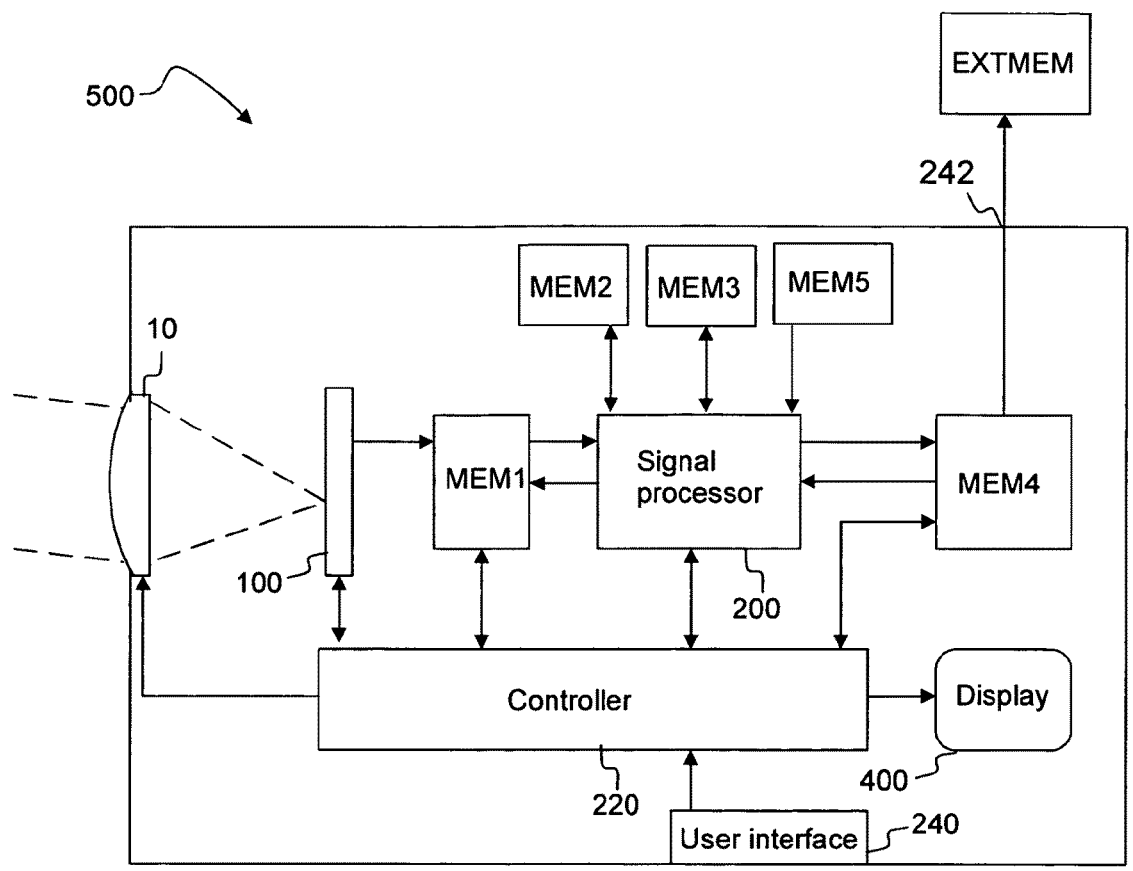
FIG. 1 shows an imaging device.

Referring to FIG. 1, an imaging device 500 may comprise imaging optics 10 and an image sensor 100 for capturing a binary digital input image IMG1 of an object, and a signal processing unit 200 arranged to provide an output image IMG2 based on an input image IMG1.

The input image IMG1 may depict an object, e.g. a landscape, a human face, or an animal. The output image IMG2 may depict the same object but at a lower resolution.

The image sensor 100 may be binary image sensor comprising a two-dimensional array of light detectors.

The image sensor 100 may be binary image sensor comprising a two-dimensional array of light detectors. The detectors may be arranged e.g. in more than 10000 columns and in more than 10000 rows. The image sensor 100 may comprise e.g. more than $10^9$ individual light detectors. An input image IMG1 captured by the image sensor 100 may comprise pixels arranged e.g. in 41472 columns and 31104 rows. (image data size $1.3 \cdot 10^9$ bits). The corresponding output image IMG2 may have a lower resolution. For example, the corresponding output image IMG2 may comprise pixels arranged e.g. in 2592 columns and 1944 rows (image data size $5 \cdot 10^6$ pixels, 8 bits per pixel, total data size $4 \cdot 10^7$ bits). Thus, the image size may be reduced e.g. by a factor of 32 ($=1.3 \cdot 10^9/4 \cdot 10^7$).

The data size of a binary input image IMG1 may be e.g. greater than or equal to 4 times the data size of a corresponding output image IMG2, wherein the data sizes may be indicated e.g. in the total number of bits needed to describe the image information. If higher data reduction is needed, the data size of the input image IMG1 may be greater than 10, greater than 20, greater than 50 times or even greater than 100 times the data size of a corresponding output image IMG2.

The imaging optics 10 may be e.g. a focusing lens.

The imaging device 500 may comprise an input memory MEM1, a memory MEM2 for storing filter arrays FA1, an operational memory MEM3, an output memory MEM4 to store output images IMG2, a display 400, a controller 220 to control the operation of the imaging device 500, a computer-readable memory MEM5 to store computer program code for the data processing algorithms, and an user interface 240 to receive commands from a user.

The input memory MEM1 may at least temporarily store at least a few rows or columns of the pixels P1 of the input image IMG1. Thus, the input memory may be arranged to store at least a part of the input image IMG1.

The signal processor 200 may be arranged to determine the elements E(m,n) of filter arrays FA1 needed for image processing. The values of the elements E(m,n) may be calculated according to the density of exposed pixels within an input image IMG1. The value of the elements E(m,n) may be stored to the memory MEM2. Alternatively, predetermined values of the elements E(m,n) may be retrieved from the memory MEM2 according to the density of exposed pixels within an input image IMG1.

The operational memory MEM3 may be used e.g. when performing sum-of-products operations.

Output image data may be transmitted from the signal processing unit 200 and/or from the output memory MEM4 to an external memory EXTMEM via a data bus 242. The information may be sent e.g. via internet and/or via a mobile telephone network.

The memories MEM1, MEM2, MEM3, MEM4, and/or MEM5 may be physically located in the same memory unit. For example, the memories MEM1, MEM2, MEM3, MEM4, and/or MEM5 may be allocated memory areas in the same component.

The imaging device 500 may further comprise a display 400 for displaying the output images IMG2. Also the input images IMG1 may be displayed. However, as the size of the input image IMG1 may be very large, it may be so that only a small portion of the input image IMG1 can be displayed at a time at full resolution.

The user of the imaging device 500 may use the interface 240 e.g. for selecting an image capturing mode, exposure time, optical zoom (i.e. optical magnification), digital zoom (i.e. cropping of digital image), and/or resolution of an output image IMG2.

The control unit 220 may be arranged to control the operation of the imaging device 500. The control unit 220 may be arranged to send signals to the image sensor 100 e.g. in order to set the exposure time, in order to start an exposure, and/or in order to reset the pixels of the image sensor 100.

The control unit 220 may be arranged to send signals to the imaging optics 10 e.g. for performing focusing, for optical zooming, and/or for adjusting optical aperture.

Thanks to image processing according to the present invention, the output memory MEM4 and/or the external memory EXTMEM may store a greater number of output images IMG2 than without said image processing. Alternatively or in addition, the size of the memory MEM4 and/or EXTMEM may be smaller than without said image processing. Also the data transmission rate via the data bus 242 may be lowered.

Figure 2:
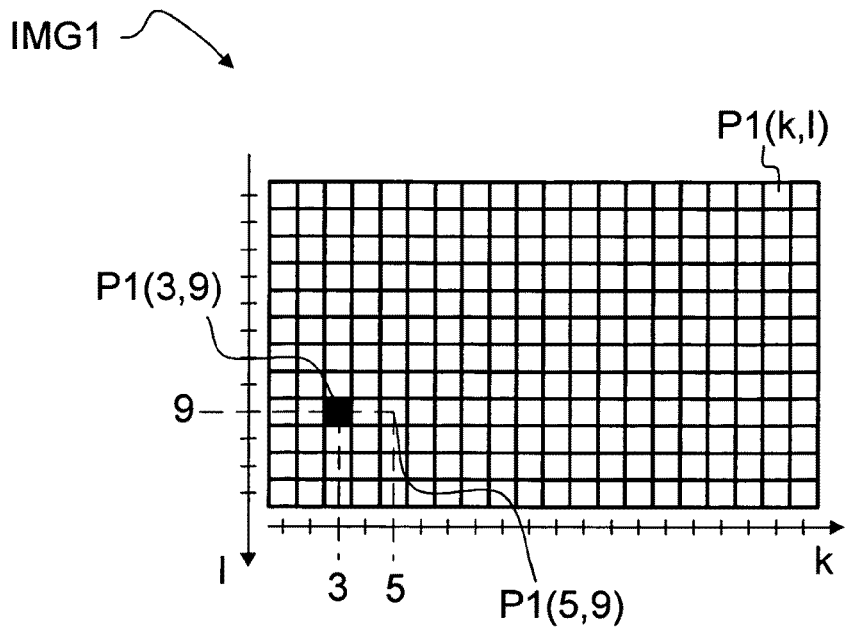
FIG. 2 shows a binary image.

Referring to FIG. 2, the image sensor 100 may be a binary image sensor arranged to provide a binary image IMG1. The image sensor 100 may comprise a two-dimensional array of light detectors such that the output of each light detector has only two logical states. Said logical states are herein called as the "black" state and the "white" state. The image sensor may be initialized such that all detectors may be initially at the black state. An individual detector may be switched into the white state by exposing it to light. Thus, a binary image IMG1 provided by the image sensor 100 may consist of pixels P1, which are either in the black state or in the white state, respectively. The expressions "white pixel" and "the pixel is white" refer to a pixel which is in the white state. The expression "black pixel" refers to a pixel which is in the black state, respectively.

The pixels P1 may be arranged in rows and columns, i.e. the position of each pixel P1 of an input image IMG1 may be defined by an index k of the respective column and the index l of the respective row. For example, the pixel P1(3,9) shown in FIG. 2 is black and the pixel P1(5,9) is white.

A binary light detector may be implemented e.g. by providing a conventional (proportional) light detector which has a very high conversion gain (low capacitance). Other possible approaches include using avalanche or impact ionization to provide in-pixel gain, or the use of quantum dots.

Figure 3:
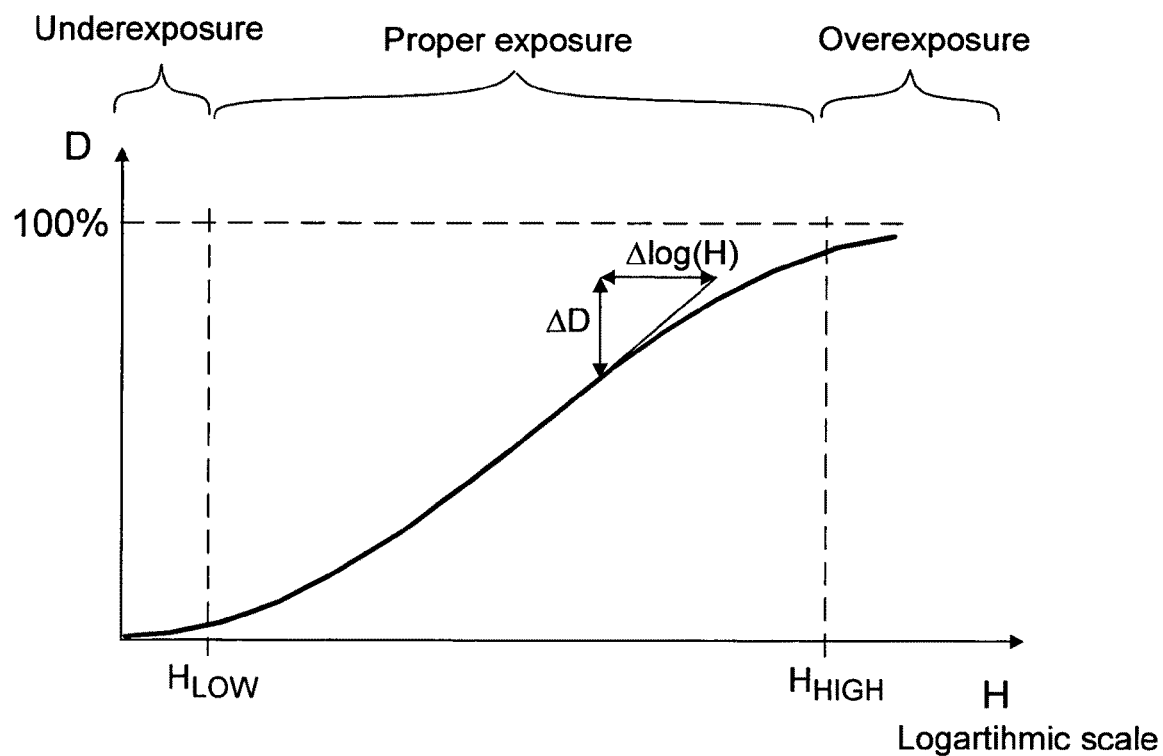
FIG. 3 shows the density of white pixels as a function of optical exposure.

FIG. 3 shows an estimate for the density D of white pixels P1 as a function of optical exposure H. The exposure H is presented in a logarithmic scale. The density D means the ratio of the number of white pixels P1 within a portion of the image IMG1 to the total number of pixels P1 within said portion. A density value 100% means that all pixels within the portion are in the white state. A density value 0% means that all pixels within the portion are in the black state. The optical exposure H is proportional to the optical intensity and the exposure time. The density D is 0% at zero exposure H. The density increases with increasing exposure until the density begins to saturate near the upper limit 100%.

The conversion of a predetermined pixel P1 from black to white is a stochastic phenomenon. The actual density of white pixels P1 within the portion of the image IMG1 follows the curve of FIG. 3 when said portion contains a high number of pixels P1.

In case of individual pixels, the curve of FIG. 3 may also be interpreted to represent the probability for a situation where the state of a predetermined pixel P1 is converted from the black state to the white state after a predetermined optical exposure H.

An input image IMG1 is properly exposed when the slope $\Delta D/\Delta \log(H)$ of the exposure curve is sufficiently high (greater than or equal to a predetermined value). Typically, this condition is attained when the exposure H is greater than or equal to a first predetermined limit $H_{LOW}$ and smaller than or equal to a second predetermined limit $H_{HIGH}$. Consequently the input image may be underexposed when the exposure H is smaller than the first predetermined limit $H_{LOW}$, and the input image may be overexposed when the exposure H is greater than the second predetermined limit $H_{HIGH}$.

The signal-to-noise ratio of the input image IMG1 or the signal-to-noise ratio of a smaller portion of the input image IMG1 may be unacceptably low when the exposure H is smaller than the first limit $H_{LOW}$ or greater than the second limit $H_{HIGH}$. In those cases it may be acceptable to reduce the effective spatial resolution in order to increase the signal-to-noise ratio.

The exposure state of a portion of a binary image depends on the density of white and/or black pixels within said portion. Thus, the exposure state of a portion of the input image IMG1 may be estimated e.g. based on the density of white pixels P1 within said portion. The density of white pixels in a portion of an image depends on the density of black pixels within said portion.

The exposure state of a portion of the input image IMG1 may also be determined e.g. by using a further input image IMG1 previously captured by the same image sensor 100. The exposure state of a portion of the input image IMG1 may also be estimated e.g. by using a further image captured by a further image sensor.

The further image sensor which can be used for determining the exposure state may also be an analog sensor. The analog image sensor comprises individual light detectors, which are arranged to provide different grey levels, in addition to the black and white color. Different portions of an image captured by an analog image sensor may also be determined to be underexposed, properly exposed, or overexposed. For example, when the brightness value of substantially all pixels in a portion of an image captured by an analog image sensor are greater than 90%, the image portion may be classified to be overexposed. For example, when the brightness value of substantially all pixels in a portion of an image captured by an analog image sensor are smaller than 10%, the image portion may be classified to be underexposed. When a considerable fraction of pixels have brightness values in the range of 10% to 90%, then the image portion may be properly exposed, respectively.

Figure 4A:
FIG. 4a shows by way of example, an image of a girl.
Figure 4B:
FIG. 4b shows a binary image corresponding to the image of FIG. 4a, FIG. 5 shows determining density values for pixel groups of a binary image.

FIG. 4a shows, by way of example, an image of a girl. FIG. 4b shows a binary image corresponding to the image of FIG. 4a. The image of FIG. 4b has a large pixel size in order to emphasize the black and white pixel structure.

Figure 5:
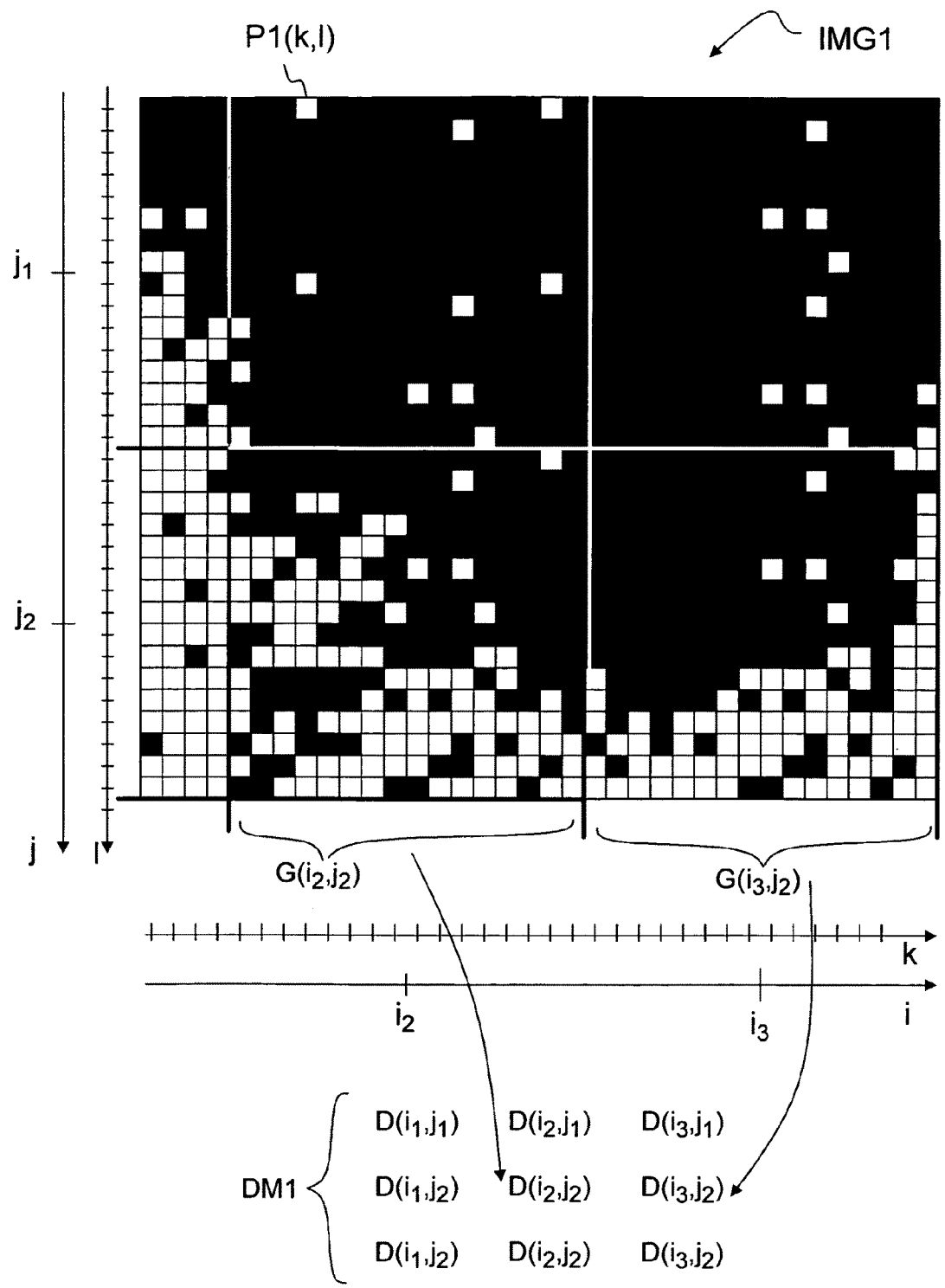

Referring to FIG. 5, a binary input image IMG1 may be divided into a plurality of input pixel groups G(i,j), wherein each input pixel group G is located at coordinates i,j. Each group G(i,j) may comprise a plurality of input pixels P1. Each group G(i,j) may preferably comprise a plurality of adjacent input pixels P1.

The input pixel groups G may be adjacent so that each pixel P1 belongs to only one group G. The groups may also be overlapping, i.e. some pixels P1 may belong to several different groups G.

A density parameter D(i,j) associated with the coordinates i,j may be determined e.g. by counting the number of white pixels within the respective input pixel group G(i,j). For example, the rectangular input pixel group $G(i_2,j_2)$ may comprise 256 input pixels arranged in a 16×16 formation such that said group $G(i_2,j_2)$ has 99 white pixels and 157 black pixels. Thus, the density parameter $D(i_2,j_2)$ corresponding to the group $G(i_2,j_2)$ may be e.g. equal to 99 or equal to 38.7% (=99/256). A second density parameter $D(i_3,j_2)$ may be determined for a second group $G(i_3,j_2)$, respectively.

The density parameters D(i,j) of the input pixel groups G may constitute a density parameter array DM1.

A density parameter D(i,j) associated with the coordinates i,j may also be determined e.g. by counting the number of black pixels within the respective input pixel group G(i,j).

Figure 6:
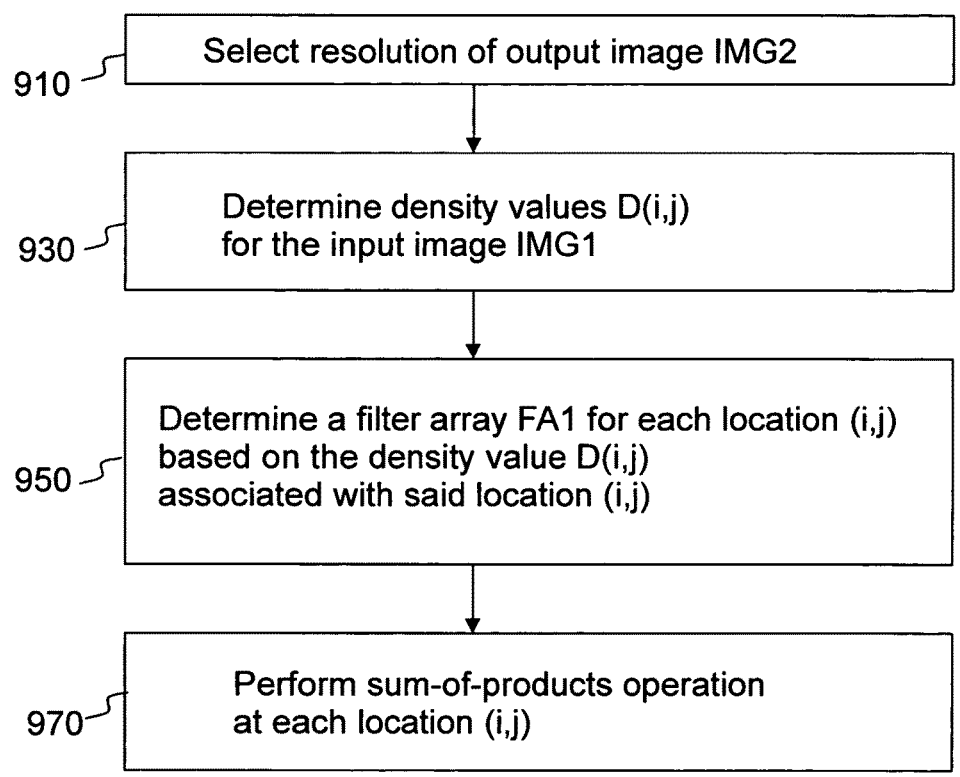
FIG. 6 shows method steps for image processing.

FIG. 6 shows method steps for providing an output image IMG2 based on a binary input image IMG1.

In step 910, a user may select the resolution of an output image IMG2. Consequently, the locations of the output pixels of the output image IMG2 may be calculated. The location of each output pixel P2 may be defined by the corresponding coordinates i,j.

In step 930, the density parameters D associated with the locations of the output pixels P2 may be determined e.g. by counting the number of white pixels within each input pixel group G In step 950, a filter array FA1 may be determined for each location (i,j) based on the density parameter D associated with said location (i,j).

In step 970, each pixel of an output image IMG2 may be provided by processing the input image IMG2 with the determined filter array FA1 or with the determined filter arrays FA1.

The values of the output pixels P2 of the output image IMG2 may be determined by performing sum-of-products operations between the elements of the filter arrays and the pixels P1 of the input image IMG1. The sum-of-products operations may be used to implement adaptive spatial low-pass filtering.

Figure 7A:
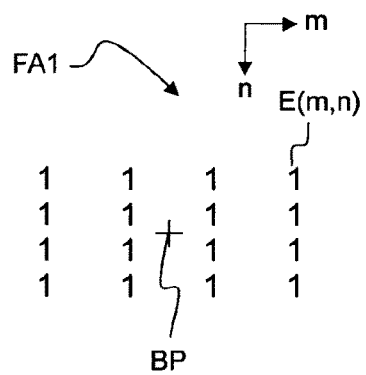
FIG. 7a shows elements of a filter array, wherein non-zero elements of said filter array form a rectangular group.

FIG. 7a shows a filter array FA1. A digital input image IMG1 may be converted into a digital output image IMG2 by using the filter array FA1. The value of each output pixel of the output image may be determined by superimposing the filter array FA1 on the input image such that the location of said filter array FA1 matches with the location of said output pixel, and by performing a sum-of-products operation between the values of the elements E of the filter array FA1 and the values of input pixels of said input image. When calculating the products of said sum-of-products operation, each value of a predetermined element E(m,n) is multiplied by the value of an input pixel whose location coincides with the location of said predetermined element E(m,n). In this multiplication, the value of each white pixel may be considered to be one, and the value of each black pixel may be considered to be equal to zero.

Alternatively, the value of each white pixel may be considered to be zero, and the value of each black pixel may be considered to be equal to one.

The filter array FA1 may comprise elements E(m,n) arranged in several rows and columns. FIG. 7a shows, by way of example, a 4×4 filter array having four columns and four rows, respectively.

The symbols m and n indicate a position in a coordinate system defined by an m-axis and an n-axis. The center BP of the filter array shown in FIG. 7a is located at coordinates m=2.5 and n=2.5. In case of the elements E, the symbols m and n are integers, which also indicate to the index of a column and to the index of a row.

The elements E(m,n) of the filter arrays FA1 represent weighing coefficients. In case of FIG. 7a, equal weight is given to pixels values close to the center BP and to pixel values further away from the center BP.

The values of the elements E(m,n) may be e.g. rounded or truncated to integer values in order to facilitate calculations. If desired, the values of all elements E(m,n) may be multiplied by a common multiplier prior to rounding or truncation e.g. in order to reduce rounding errors.

Figure 7B:
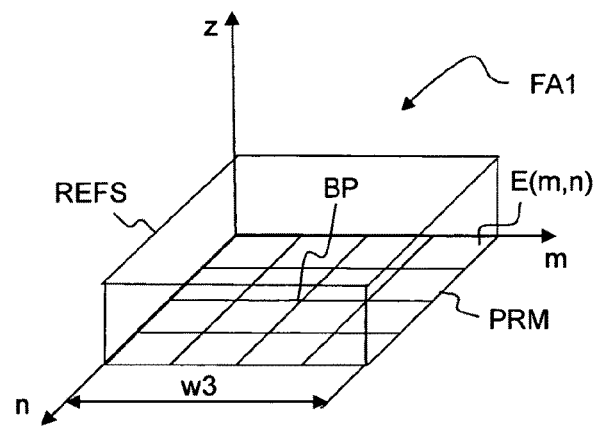

Referring to FIG. 7b, the values of the elements E(m,n) may be indicated in the z-axis as a function of the location (m,n) of each element E. Non-zero values of the elements E(m,n) of the filter array FA1 may approximate a reference surface REFS. In particular, the value of each non-zero element E(m,n) may be equal to the value of the reference surface REFS at the corresponding position (m,n). FIG. 7b shows a planar rectangular reference surface REFS superimposed over the locations of the elements E(m,n) of a filter array FA1.

BP denotes the center of the filter array FA1.

The filter array FA1 may comprise positive elements E, which substantially deviate from zero. The filter array FA1 may comprise elements, which are substantially equal to zero. Yet, the filter array FA1 may comprise negative values, e.g. for edge enhancement purposes and/or for controlling the spatial frequency response provided by the filter array FA1.

PRM denotes the perimeter of those outermost elements E of the filter array FA1, whose values substantially deviate from zero. In other words, the perimeter PRM encloses those elements E of the filter array FA1, which substantially deviate from zero.

Figure 7C:
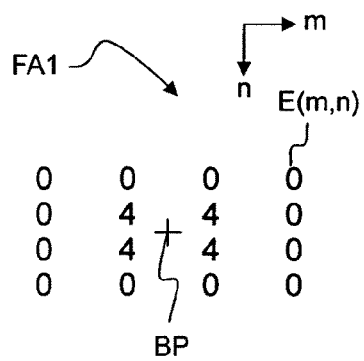
FIG. 7c shows elements of a filter array, wherein the filter array of FIG. 7c is narrower than the filter array of FIG. 7a, FIG. 7d shows, in a three dimensional view, the values of the elements of a filter array of FIG. 7c.
Figure 7D:
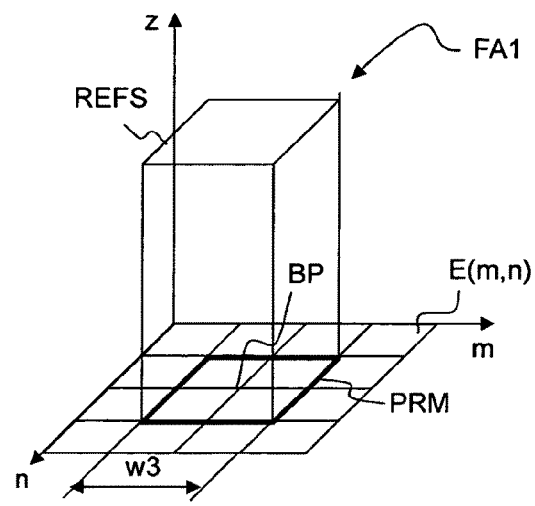
Figure 7E:
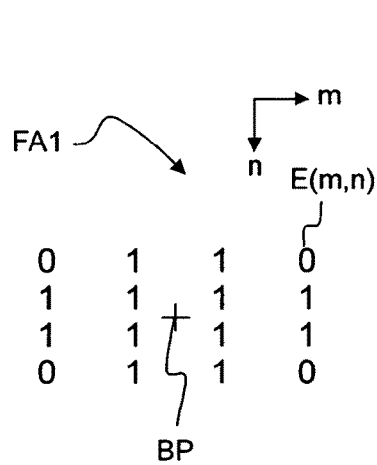
FIG. 7e shows elements of a filter array, wherein the values of non-zero elements of said filter array approximate a circular planar surface.
Figure 10A:
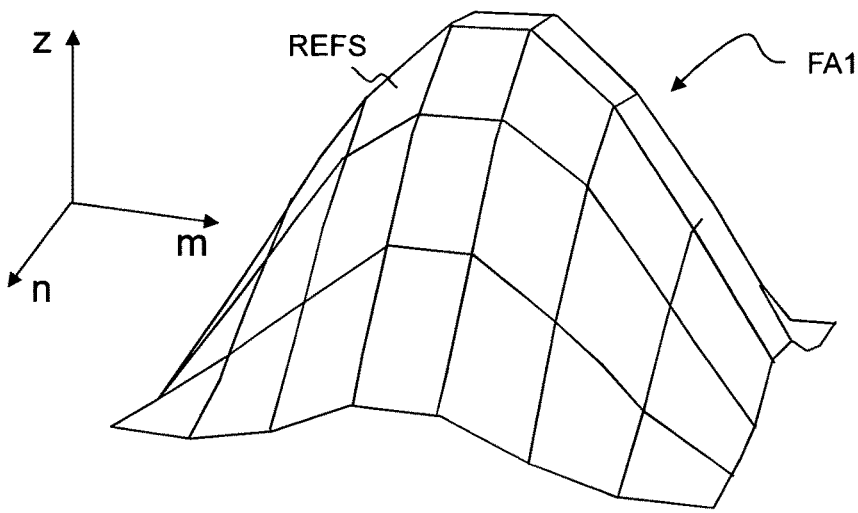
FIG. 10a shows, in a three dimensional view, the values of the elements of a filter array approximating the two-dimensional sinc function.
Figure 10B:
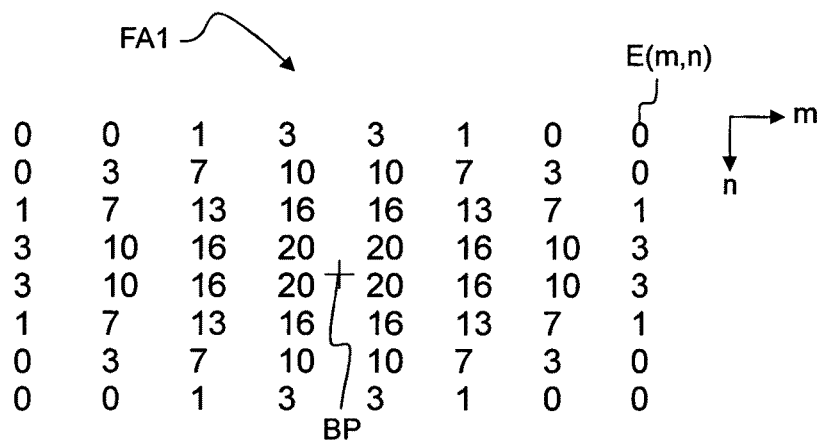
FIG. 10b shows the values of the elements of a filter array approximating the two-dimensional sinc function.

In certain cases, the values of some elements E e.g. in the corners of the filter array FA1 may be substantially equal to zero (see e.g. FIGS. 7e and 10b). It is emphasized that the outermost elements E defining the perimeter PRM do not need to be in the first or last columns and/or rows of the filter array FA1. In addition, some elements e.g. near the center of the filter array FA1 may also be substantially equal to zero. Thus, the perimeter PRM may also enclose one or more elements E which are substantially equal to zero.

The perimeter PRM does not comprise concave sections. The perimeter PRM may also be defined to be the shortest closed path which encloses at least 90% of the sum of the values of all elements of the filter array FA1. In other words, the sum of the values of the elements within the perimeter PRM may be greater than or equal to 90% of the sum of the values of all elements of the filter array FA1.

w3 denotes the width of the perimeter PRM. The effective width of the filter array FA1 is equal to the width w3 of the perimeter PRM.

FIG. 7c shows a filter array FA1 which is narrower than the filter array FA1 of FIG. 7a. The values of the elements E may be normalized such that the sum of all elements E of each single filter array FA1 is the same for all different filter arrays FA1 applied on a single input image IMG1.

FIG. 7d shows, in a three dimensional view, the values of the elements of the filter array FA1 of FIG. 7c.

FIG. 7e shows a filter array FA1 comprising zero elements at the corners. In this case, the spatial frequency response provided by the filter array is less dependent on the orientation of visual features in the input image IMG1 than when using the rectangular filter array of FIG. 7a. In other words, the spatial frequency response may be nearly the same for horizontal lines and lines which are at a 45 degree inclination.

Figure 7F:
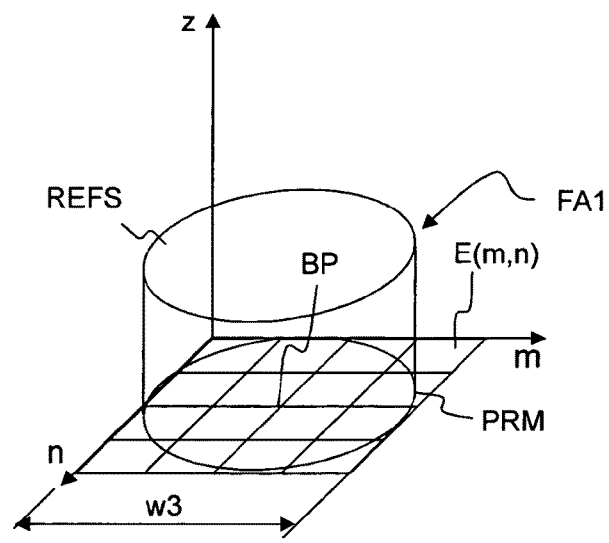
FIG. 7f shows in a three dimensional view, a circular reference surface over the locations of the elements of a filter array.

FIG. 7f shows a filter array FA1, whose element values approximate a circular disc, in order to provide a spatial frequency response, which is substantially independent of the orientation of visual features in the input image IMG1.

Figure 8:
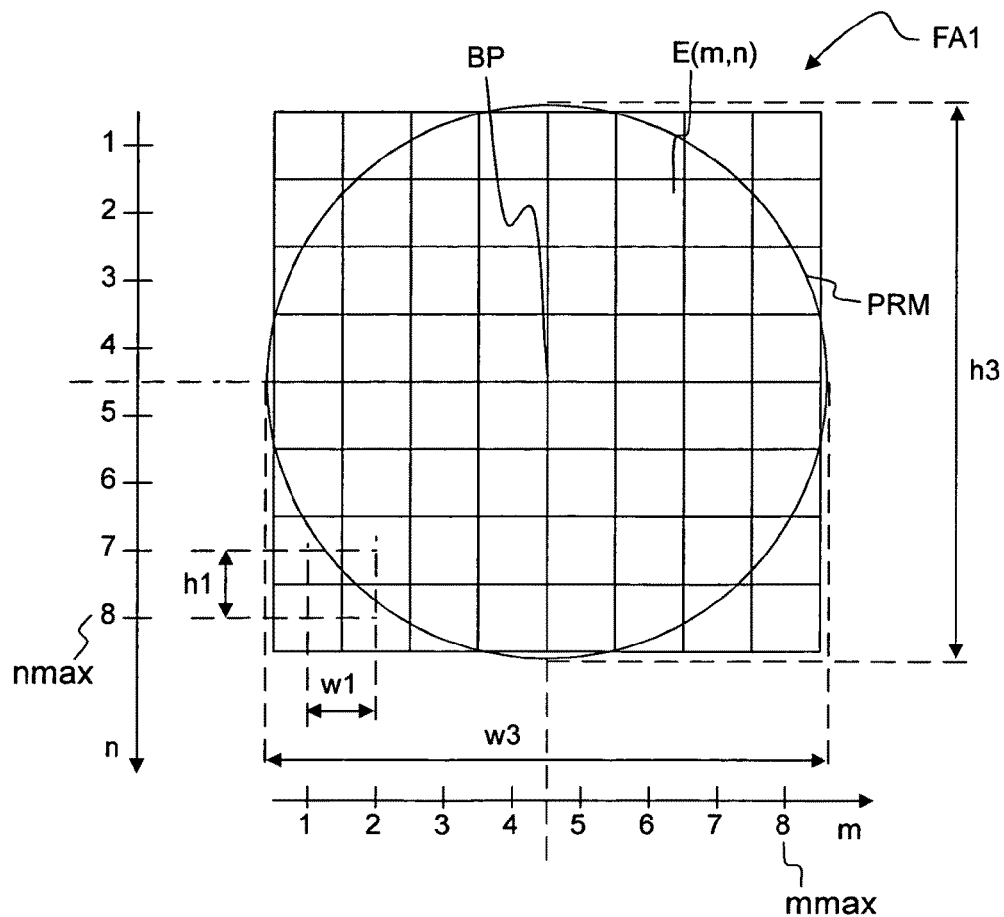
FIG. 8 shows parameters describing a filter array.

FIG. 8 shows the positions of elements E(m,n) of a filter array FA1 with respect to the center BP.

The perimeter PRM may be e.g. rectangular or elliptical. The symbol w3 denotes width of the perimeter PRM and the effective width of the filter array FA1. The symbol h3 denotes the height said perimeter PRM and the effective height of the filter array FA1. In case of a circle or a square, the width w3 is equal to h3.

Figure 9:
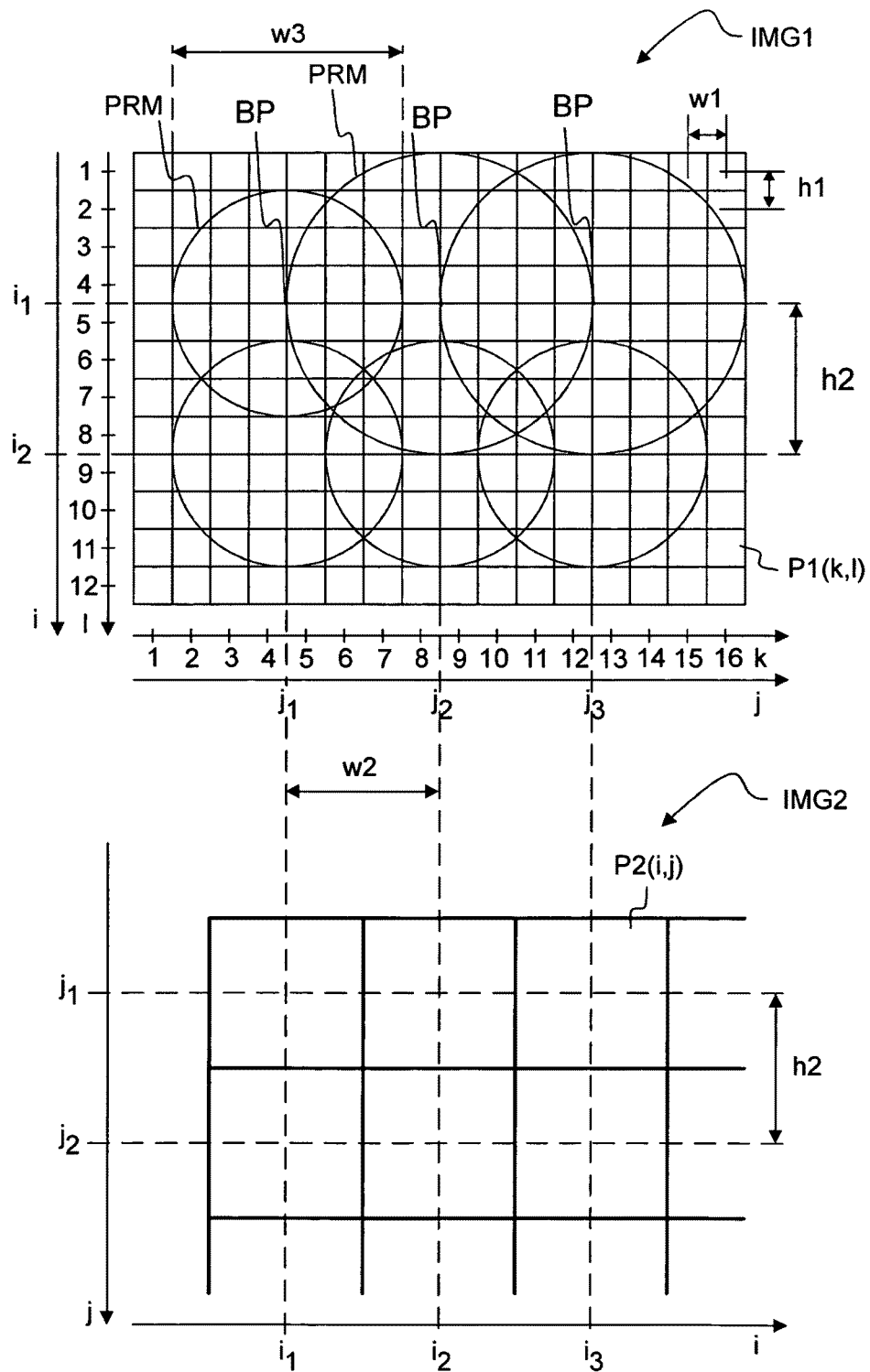
FIG. 9 shows positions of the pixels of an output image with respect to the positions of the pixels of an input image.

The position of the center of each element E(m,n) may be indicated by an index m, which indicates the horizontal position of the center of said element E(m,n), and by an index n, which indicates the vertical position of the center of said element E(m,n). In case of the elements E, m and n are integers. However, the center BP may be located e.g. at coordinates m=4.5 and n=4.5.

w1 denotes the horizontal distance between the centers of adjacent elements E(m,n). h1 denotes the vertical distance between the centers of adjacent elements E(m.n). w1 also denotes the horizontal distance between the centers of adjacent pixels of the input image IMG1. h1 also denotes the vertical distance between the centers of adjacent pixels P1(k, l) of the input image IMG1 (see FIG. 9).

w1 and h1 may be handled in a dimensionless form, For example, it may be assumed that w1=1, and h1=1.

FIG. 9 shows providing an output image IMG2 from an input image IMG1 by using filter arrays FA1.

The input image IMG1 consists of input pixels P1(k,l). The symbol k indicates the index of a column, and the symbol l indicates the index of a row. k and l may be integers.

The output image IMG2 consists of output pixels P2(i,j). The symbol i indicates the index of a column, and the symbol j indicates the index of a row. i and j may be integers.

Also simplified notations P1, P2, G, and E are used herein instead of P1(k,l), P2(i,j), G(i,j) and E(m,n).

w2 denotes the horizontal distance between the centers of adjacent output pixels P2(i,j). h2 denotes the vertical distance between the centers of adjacent output pixels P2(i,j).

w2 and h2 may also be called as the "stepping size". w2 may be e.g. equal to 16×w1, and h2 may be equal to 16×h1, respectively. In case of FIG. 9, the horizontal stepping size w2=4×w1, and the vertical stepping size h2=4×h1.

The output image IMG2 may be scaled by a horizontal scaling factor $CF_H$ and by a vertical scaling factor $CF_V$. By definition, $CF_H$=w2/w1, and $CF_V$=h2/h1. Consequently, w2=$CF_H$·w1, and h2=$CF_V$·h1.

The horizontal scaling factor $CF_H$ may also be understood to be ratio of the number of columns of the input image IMG1 to the number of columns of the output image IMG2. The vertical scaling factor $CF_V$ may also be understood to be ratio of the number of rows of the input image IMG1 to the number of rows of the output image IMG2.

Once the position of a first output pixel P2 has been selected, the locations of all the other output pixels P2 may be determined according to the selected horizontal scaling factor $CF_H$ and the according to the selected vertical scaling factor $CF_V$, i.e. according to the distances w2 and h2.

The value of an output pixel P2(i,j) of the output image IMG2 may be calculated by performing a sum-of-products operation between the elements of a filter array FA1 and corresponding pixels P1 of the input image IMG1, e.g. by the equations:

$$P2(i, j) = \sum_{\substack{m=1 \\ n=1}}^{\substack{N_{max} \\ M_{max}}} P1(k, l) E(m, n) \quad (1a)$$

where $$k = (i-1)CF_H + m \quad (1b)$$

and $$l = (j-1)CF_V + n \quad (1c)$$

Mmax denotes the number of columns of the filter array FA1 and Nmax denotes the number of rows of the filter array FA1.

It may also be noticed that if the values E(m,n) of the filter array FA1 are separable, it is possible to calculate the value of the output pixel P2 by using separate row-wise and column-wise computation. Separate row-wise and column-wise computation may reduce the number of arithmetic operations needed to perform the sum-of-product operation.

The value of an element E(m,n) is separable, if it can be expressed in the form:

$$E(m,n) = g_1(m) \cdot g_2(n) \quad (2)$$

where $g_1(m)$ denotes a function which depends on the index m but does not depend on the index n. $g_2(n)$ denotes a function which depends on the index n but does not depend on the index m.

The filter array FA1 may be determined according to the average density of exposed pixels within a portion of the input image IMG1.

In particular, the filter array FA1 may be determined according to the density of exposed pixels in an input pixel group G(i,j) corresponding to the location (i,j) of an output pixel (P2).

In particular, different portions of an input image IMG1 may be processed by using different filter arrays FA1.

When expressed verbally, the value of an output pixel P2(i,j) of the output image IMG2 may be calculated by:
determining a location i,j of an output pixel P2 with respect to the input image IMG1,
determining a filter array FA1 based on the location i,j of said output pixel P2 or based on the density of exposed pixels in the vicinity of said output pixel P2, and
determining the value of said output pixel P2 by performing a sum-of-products operation between non-zero values of the elements E of said filter array FA1 and the values of input pixels P1 of the input image IMG1 located at respective positions, when the filter array FA1 is superimposed on the input image IMG1 such that the center of said filter array FA1 corresponds to the location of said output pixel (P2).

When performing said sum-of-products operation, the filter array FA1 is positioned such that locations of the elements E coincide with locations of the pixels P1 of the input image IMG1. Each value of an element E is multiplied by the value of an input pixel P1 coinciding with the location of said element E.

The symbols $i_1$, $i_2$, $i_3$ denote horizontal coordinates of the output pixels P2(i,j). The symbols $j_1$, $j_2$ denote vertical coordinates of the output pixels P2(i,j).

When calculating the value of the output pixel P2 at the coordinates $i_1,j_1$, a filter array FA1 may be positioned on the input image IMG1 such that the center BP of said filter array FA1 corresponds to the location $(i_1,j_1)$ of said output pixel P2 with respect to the input image IMG1.

Different filter arrays FA1 may be applied at different locations. For example, input pixels P1 in the vicinity of the location $(i_1,j_1)$ may be properly exposed, and input pixels P1 in the vicinity of the location $(i_2,j_1)$ may be underexposed. Thus, a filter array FA1 applied at the location $(i_1,j_1)$ may be narrower than a filter array FA1 applied at the location $(i_2,j_1)$ Thus, a narrower filter array FA1 may be applied at locations of the input image IMG1, which are properly exposed, and a wider filter array FA1 may be applied at locations of said input image IMG1 which are underexposed or overexposed.

The size of a filter array FA1 applied at each location (i,j) may also be determined such that the perimeter PRM of said filter array FA1 encloses a predetermined number of white or black input pixels P1. When dealing with underexposed image portions, the size of the filter array FA1 may be enlarged starting e.g. from a 16×16 filter array FA1 until the perimeter PRM encloses e.g. 100 white pixels. When dealing with overexposed image portions, the size of the filter array FA1 may be enlarged starting e.g. from a 16×16 filter array FA1 until the perimeter PRM encloses e.g. 100 black pixels.

However, also in these cases the upper size of the filter array FA1 may be limited to a predetermined upper size. The upper size of the filter array FA1 may be limited e.g. to the size of 64×64 elements E(m,n).

The location (i,j) of each output pixel P2 may be associated e.g. with the center of said output pixel P2. Alternatively, the location (i,j) of each output pixel P2 may be associated e.g. with a predetermined corner of said output pixel P2.

FIG. 10a shows a filter array FA1, wherein the values of the elements E(m,n) of said filter array FA1 approximate a two-dimensional (truncated) sinc function. The two-dimensional sinc function may provide a substantially uniform spatial frequency response up to a predetermine spatial cut-off frequency. However, calculations with filter arrays FA1 whose element values have the same value may be faster than calculations with a plurality of different values.

Figure 10C:
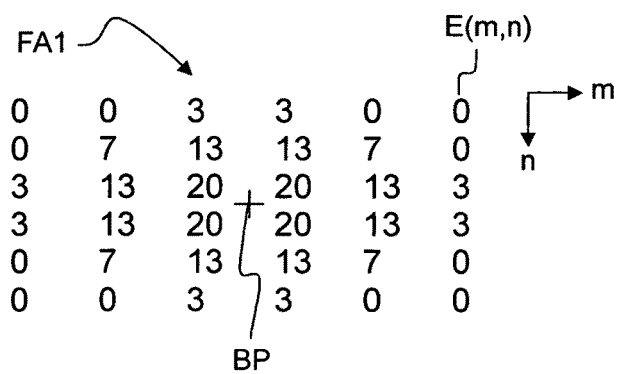
FIG. 10c shows the values of the elements of a filter array approximating the two-dimensional sinc function, the filter array of FIG. 10c being narrower than the filter array of FIG. 10b.

FIG. 10b shows numerical values of a two-dimensional sinc filter. FIG. 10c shows numerical values of a two-dimensional sinc filter, which is narrower than the filter of FIG. 10b.

Figure 11A:
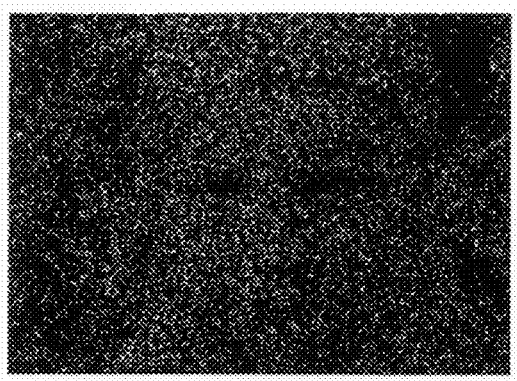
FIG. 11a shows an underexposed binary image.

FIG. 11a shows, by way of example, an underexposed binary input image IMG1.

Figure 11B:
FIG. 11b shows an output image obtained by processing the image of FIG. 11a with adaptive filter widths, FIG. 11c indicates the widths of the filter arrays applied at different locations of FIG. 11b.

FIG. 11b shows an output image IMG2 provided from the input image IMG1 by using adaptive filter width. Wider filter arrays FA1 have been applied at locations, which are severely underexposed, and narrower filter arrays FA1 have been applied at locations, which have received more light. In other words, wider filter arrays FA1 have been applied at locations, where the density of the white pixels is lower, and narrower filter arrays FA1 have been applied at locations, where the density of the white pixel is higher.

In this case the size of the filter arrays FA1 has been in the range of 22×22 to 32×32. The horizontal scaling factor $CF_H$ and the vertical scaling factor $CF_V$ were equal to 16.

Figure 11C:
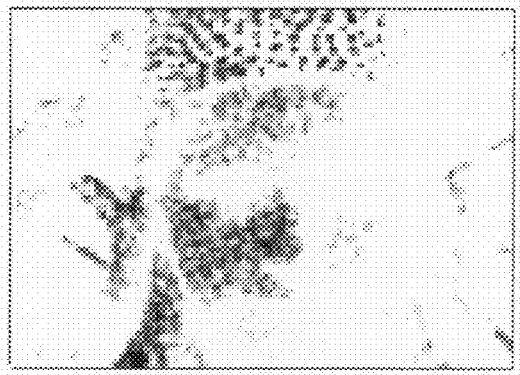
FIG. 11d shows an image provided by processing the image of FIG. 11a with a constant filter width.

FIG. 11c shows in different shades of grey the widths of the filter arrays FA1 applied at each location of the output image IMG2 of FIG. 11b. Darkest regions indicate locations where a 22×22 filter array FA1 has been applied, and the brightest regions indicate locations where a 32×32 filter array has been applied.

Figure 11D:

FIG. 11d shows a comparative output image IMG2 which has been provided by using the same filter array FA1 at each position. In case of FIG. 11d, the filter array FA1 was a 16×16 filter. The horizontal scaling factor $CF_H$ and the vertical scaling factor $CF_V$ were equal to 16.

The signal-to-noise ratio of FIG. 11d is 14.9 dB, and the signal-to-noise ratio of FIG. 11b is 18.6 dB. Thus the signal-to-noise ratio of FIG. 11b is better than the signal-to-noise ratio of FIG. 11d.

Figure 12A:
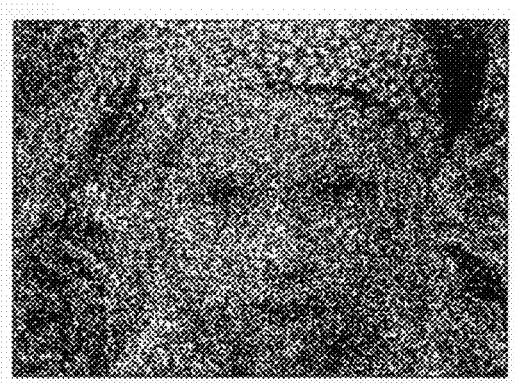
FIG. 12a shows a properly exposed binary image.

FIG. 12a shows a properly exposed binary input image IMG1.

Figure 12B:
FIG. 12b shows an output image obtained by processing the image of FIG. 12a with adaptive filter widths, FIG. 12c indicates the widths of the filter arrays applied at different locations of FIG. 12b.

FIG. 12b shows an output image IMG2 provided from the input image IMG1 by using adaptive filter width. Wider filter arrays FA1 have been applied at locations, where the density of the white pixels is lower, and narrower filter arrays FA1 have been applied at locations, where the density of the white pixel is higher.

Figure 12C:
FIG. 12d shows an image provided by processing the image of FIG. 12a with a constant filter width.

FIG. 12c shows in different shades of grey the widths of the filter arrays FA1 applied at each location of the output image IMG2 of FIG. 12b. Darkest regions indicate locations where a 22×22 filter array FA1 has been applied, and the brightest regions indicate locations where a 32×32 filter array has been applied.

Figure 12D:

FIG. 12d shows a comparative output image IMG2 which has been provided by using a fixed width of a filter array FA1. In case of FIG. 12d, the filter array FA1 was a 16×16 filter.

The signal-to-noise ratio of FIG. 12d is 21.5 dB, and the signal-to-noise ratio of FIG. 12b is 23.0 dB. Also in this case the signal-to-noise ratio of FIG. 12b is at least slightly better than the signal-to-noise ratio of FIG. 12d.

Figure 13A:
FIG. 13a shows an overexposed binary image.

FIG. 13a shows an overexposed binary input image IMG1.

Figure 13B:
FIG. 13b shows an output image obtained by processing the image of FIG. 13a with adaptive filter widths.

FIG. 13b shows an output image IMG2 provided from the input image IMG1 by using adaptive filter width. Wider filter arrays FA1 have been applied at locations, where the density of the white pixels is lower, and narrower filter arrays FA1 have been applied at locations, where the density of the white pixels is higher.

Figure 13C:
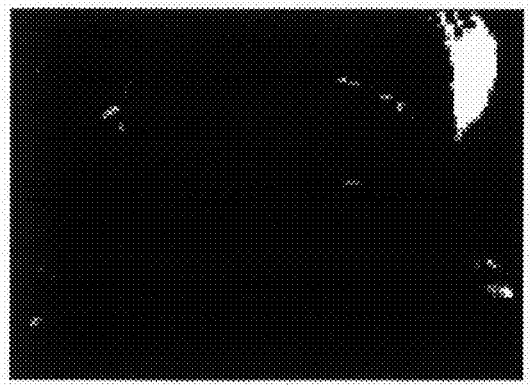
FIG. 13c shows the widths of the filter arrays applied at different locations of FIG. 13b.

FIG. 13c shows in different shades of grey the widths of the filter arrays FA1 applied at each location of the output image IMG2 of FIG. 13b. Darkest regions indicate locations where a 22×22 filter array FA1 has been applied, and the brightest regions indicate locations where a 32×32 filter array has been applied.

Figure 13D:
FIG. 13d shows an image provided by processing the image of FIG. 13a with a constant filter width.

FIG. 13d shows a comparative output image IMG2 which has been provided by using a fixed width of a filter array FA1. In case of FIG. 13d, the filter array FA1 was a 16×16 filter.

The signal-to-noise ratio of FIG. 13d is 20.2 dB, and the signal-to-noise ratio of FIG. 13b is 22.0 dB. Also in this case the signal-to-noise ratio of FIG. 13b is at least slightly better than the signal-to-noise ratio of FIG. 13d.

The filter arrays FA1 applied at each location may also be determined based on a previous image or based on an image captured by a different image sensor. For example, the filter arrays FA1 may be determined using a viewfinder image. The viewfinder image may be obtained e.g. by processing an input image captured by the image sensor 100. However, image processing for the viewfinder image may be performed in a simpler way and/or with a lower resolution than image processing for the final output image IMG2.

If the filter arrays FA1 are determined based on a further image instead of the input image IMG1, the further image should be captured substantially in the same illumination conditions as the input image IMG1, and the further image should also depict the same portion of the same object as the input image IMG1.

The method according to the invention may also be used for processing video images captured by a binary image sensor. Also in that case, the exposure of a portion of an input image IMG1 may be estimated based on a previous input image IMG1.

The widths w3 of the filter arrays FA1 may be further adjusted e.g. by using edge detection. A digital input image IMG1 or a further image may be analyzed so as to detect edges of visual features within said image. A narrower filter array FA1 may be applied at regions where edges have been detected, and a wider filter FA1 may be applied at substantially uniform regions. A large difference in the density of white pixels between adjacent pixel groups G may indicate an edge, and a small difference in the density of white pixels between adjacent pixel groups G may indicate substantially uniform image regions.

The device 500 may also be implemented without the imaging optics 10 and the image sensor 100. In that case the device 500 may be arranged to process input images IMG1 previously captured and stored in the input memory MEM1.

The device 500 may further comprise e.g. a data processing unit, memory and communications unit to provide access to a mobile telephone network, internet or local area network. The device 500 may be or may be a part of a device selected from the following list: an imaging module connectable to a further device, portable device, device with wireless telecommunicating capabilities, imaging device, mobile phone, gaming device, music recording/playing device (based on e.g. MP3-format), measuring instrument, target finding device, aiming device, navigation device, personal digital assistant (PDA), communicator, portable internet appliance, hand-held computer, accessory to a mobile phone.

The device 500 may be arranged to process data of an input image IMG1, which is e.g. graphics or text.

Image data may also be compressed in two or more steps. For example, an input image may be scaled horizontally, and the horizontally scaled image may subsequently be scaled vertically, or vice versa. An image may be scaled horizontally by performing the sum-of-products operation with a one-dimensional filter array (i.e. a vector), which has only one row of elements. Even in that case the values of the elements E(m,n) and the widths of the filter arrays may be determined according to the density of white pixels within the input image.

An image may be scaled vertically by performing the sum-of-products operation with a one-dimensional filter array, which has only one column of elements.

The size of the individual light detectors of a binary image sensor may be smaller than the minimum size of a focal spot which can be provided by the imaging optics 10 of a digital camera. The use of an image sensor 100 which has so small detectors may help to avoid e.g. color aliasing problems due to color filter arrays.

The size of the individual light detectors of a binary image sensor 100 may even be smaller than the minimum size of a diffraction spot of the imaging optics 10. For example, the smallest focal spot might cover more than 40 detectors. Thus, the diameter of the smallest focal spot may correspond to a width, which is greater than the combined width of 7 adjacent pixels of a binary input image IMG1. Consequently, image noise may be reduced to some degree by spatial averaging without losing significant details of a captured image.

An advantage associated with the use of a binary image sensor 100 is also that a considerable number of defective light detectors may be tolerated without significantly degrading the quality of the output image IMG2. The locations of the defective light detectors of an image sensor 100 may be determined e.g. by a calibration measurement at the factory, and the effect of the defective light detectors may be compensated e.g. by multiplying the values of the elements of the filter arrays FA1 with corresponding correction coefficients. Each element of a particular filter array FA1 may be multiplied by the same predetermined coefficient. The correction coefficients may be arranged as a correction array.

Thus, the values of the elements of the filter arrays FA1 may be adjusted such that an output image IMG2 having a substantially uniform brightness may be provided in a situation where an image of a substantially uniform surface is captured by an image sensor 100 having defective light detectors. The relative fraction of defective detectors may be e.g. up to 10% without significantly degrading the quality of the output image, provided that the defective detectors are substantially evenly distributed among the operating detectors.

The output pixels P2 do not need to be arranged in a rectangular grid. The locations of the output pixels P2 may coincide e.g. with nodes of a triangular or hexagonal grid.

Color images may be provided e.g. by using optical color filters. The filters may provide e.g. red (R), green (G) and blue (B) color. The imaging device 500 may comprise e.g. three image sensors 100 to capture images of different colors, wherein light impinging on each sensor 100 may be filtered by a filter having a different color. Images provided by the different image sensors may be subsequently combined so as to form a color image.

Alternatively, a color filter array may be superposed on a single image sensor. Thus, different pixel groups of an image captured by the sensor may represent different colors. The pixel groups of different colors may be separated from each other so as to form a set of input images. The input images may be processed separately and the resulting output image may be combined so as to form a processed color image.

The various aspects of the invention are illustrated by the following examples:

Example 1

A method for providing an output image (IMG2) based on a binary input image (IMG1), said method comprising:
  determining a location (i,j) of an output pixel (P2) with respect to said input image (IMG1),
  determining values of elements (E) of a filter array (FA1) such that the effective width (w3) of said filter array (FA1) depends on an exposure state of a portion of an image (IMG1), and
  determining the value of said output pixel (P2) by performing a sum-of-products operation between non-zero values of the elements (E) of said filter array (FA1) and the values of input pixels (P1) of the input image (IMG1) located at respective positions, when the filter array FA1 is superimposed on the input image (IMG1) such that the center (BP) of said filter array FA1 corresponds to the location of said output pixel (P2).

Example 2

The method of example 1, wherein the data size of said binary input image (IMG1) is greater than or equal to 4 times the data size of said output image (IMG2).

Example 3

The method of example 1 or 2, wherein the effective width (w3) of said filter array (FA1) depends on the density (D) of white or black binary pixels (P1) within an input image (IMG1).

Example 4

The method according to any of the examples 1 to 3, wherein the values of elements (E) of said filter array (FA1) are determined such that the effective width (w3) of said filter array (FA1) depends on the density (D) of white or black input pixels (P1) in an input pixel group G(i,j) corresponding to the location (i,j) of said output pixel (P2).

Example 5

The method according to any of the examples 1 to 4, wherein the value of a first output pixel (P2) is determined by using a first filter array (FA1) having a first width (w3), and a second output pixel (P2) is determined by using a second filter array (FA1) having a second different width (w3).

Example 6

The method according to any of the examples 1 to 5, wherein the effective width (w3) of said filter array (FA1) depends on the density (D) of white or black input pixels (P1) within a portion of further input image IMG1.

Example 7

The method according to any of the examples 1 to 6, wherein the effective width (w3) of said filter array (FA1) is greater than the horizontal distance between adjacent pixels (P2) of said output image (IMG2).

Example 8

The method according to any of the examples 1 to 7, further comprising:
  setting the effective width (w3) of said filter array (FA1) to an initial value, and
  increasing the effective width (w3) of said filter array (FA1) until said filter array (FA1) covers a predetermined number of white or black input pixels (P1) when the filter array FA1 is superimposed on the input image (IMG1) such that the center (BP) of said filter array FA1 corresponds to the location of said output pixel (P2).

Example 9

The method according to any of the examples 1 to 8, wherein the values of elements (E) near the center (BP) of said filter array (FA1) are greater than the values of elements (E), which are located farther away from the center (BP) of said filter array (FA1).

Example 10

The method according to any of the examples 1 to 9 further comprising capturing said input image (IMG1) by a binary image sensor (100) and imaging optics (10).

Example 11

The method of example 10 wherein individual detectors of said binary image sensor (100) are smaller than a minimum focal spot of said imaging optics (10).

Example 12

A computer readable medium (MEM5) comprising program code, which when executed by a data processor is for executing a method according to any of the claims 1 to 11.

Example 13

A computer program code, which when executed by a data processor is for executing a method according to any of the claims 1 to 11.

Example 14

A device arranged to provide an output image (IMG2) by the method according to any of the examples 1 to 11.

Example 15

A device (500) for providing an output image (IMG2) based on an input image (IMG1), said device (500) comprising a signal processor (200) arranged to:
  determine a location (i,j) of an output pixel (P2) with respect to said input image (IMG1),
  determine values of elements (E) of a filter array (FA1) such that the effective width (w3) of said filter array (FA1) depends on an exposure state of a portion of an image (IMG1), and
  determine the value of said output pixel (P2) by performing a sum-of-products operation between non-zero values of the elements (E) of said filter array (FA1) and the values of input pixels (P1) of the input image (IMG1) located at respective positions, when the filter array FA1 is superimposed on the input image (IMG1) such that the center (BP) of said filter array FA1 corresponds to the location of said output pixel (P2).

Example 16

The device (500) of example 15, wherein said signal processor (200) is arranged to operate such that the effective width (w3) of said filter array (FA1) depends on the density (D) of white or black binary pixels (P1) within an input image (IMG1).

Example 17

The device (500) of example 15 or 16, wherein the effective width (w3) of said filter array (FA1) depends on the density (D) of white or black input pixels (P1) within a portion of further input image IMG1.

Example 18

The device (500) according to any of the examples 15 to 17, wherein said signal processor (200) is arranged to provide the value of a first output pixel (P2) is by using a first filter array (FA1) having a first width (w3), and the value of a second output pixel (P2) by using a second filter array (FA1) having a second different width (w3).

Example 19

The device (500) according to any of the examples 15 to 18 further comprising an image sensor (100) arranged to capture a binary input image (IMG1).

Example 20

The device (500) of example 19 wherein individual detectors of said binary image sensor (100) are smaller than a minimum focal spot of said imaging optics (10).

Example 21

The method according to any of the examples 15 to 20, wherein the data size of said binary input image (IMG1) is greater than or equal to 4 times the data size of said output image (IMG2).

The drawings are schematic. For the person skilled in the art, it will be clear that modifications and variations of the devices, methods and data structures according to the present invention are perceivable. The particular embodiments described above with reference to the accompanying drawings are illustrative only and not meant to limit the scope of the invention, which is defined by the appended claims.

What is claimed is:

1. A method for providing an output image, comprising:
  determining a location of an output pixel with respect to a binary input image,
  determining values of elements of a filter array such that the effective width of said filter array depends on an exposure state of a portion of an image, and
  determining the value of said output pixel by performing a sum-of-products operation between non-zero values of the elements of said filter array and the values of input pixels of the input image located at respective positions, when the filter array is superimposed on the input image such that the center of said filter array corresponds to the location of said output pixel.

2. The method of claim 1, wherein the data size of said binary input image is greater than or equal to 4 times the data size of said output image.

3. The method of claim 1, wherein the effective width of said filter array depends on the density of white or black binary pixels within an image.

4. The method of claim 3, wherein the values of elements of said filter array are determined such that the effective width of said filter array depends on the density of white or black input pixels in an input pixel group corresponding to the location of said output pixel.

5. The method of claim 1, wherein the value of a first output pixel is determined by using a first filter array having a first width, and a second output pixel is determined by using a second filter array having a second different width.

6. The method of claim 1, wherein the effective width of said filter array depends on the density of white or black input pixels within a portion of a further input image.

7. The method of claim 1, wherein the effective width of said filter array is greater than the horizontal distance between adjacent pixels of said output image.

8. The method of claim 1, further comprising:
setting the effective width of said filter array to an initial value, and
increasing the effective width of said filter array until said filter array covers a predetermined number of white or black input pixels when the filter array is superimposed on the input image such that the center of said filter array corresponds to the location of said output pixel.

9. The method of claim 1, wherein the values of elements near the center of said filter array are greater than the values of elements, which are located farther away from the center of said filter array.

10. The method of claim 1 further comprising capturing said input image by a binary image sensor and imaging optics.

11. The method of claim 10 wherein individual detectors of said binary image sensor are smaller than a minimum focal spot of said imaging optics.

12. A non-transitory computer readable medium stored with program code, which code when executed by a data processor causes at least the following:
determining a location of an output pixel with respect to said input image,
determining values of elements of a filter array such that the effective width of said filter array depends on an exposure state of a portion of an image, and
determining the value of said output pixel by performing a sum-of-products operation between non-zero values of the elements of said filter array and the values of input pixels of the input image located at respective positions, when the filter array is superimposed on the input image such that the center of said filter array corresponds to the location of said output pixel.

13. The non-transitory computer readable medium of claim 12, wherein the effective width of said filter array is arranged to depend on the density of white or black binary pixels within an input image.

14. A device comprising at least one signal processor and at least one memory, including program code, the at least one memory and the program code configured to, with the at least one signal processor, cause the device at least to perform:
determine a location of an output pixel with respect to an input image,
determine values of elements of a filter array such that the effective width of said filter array depends on an exposure state of a portion of an image, and
determine the value of said output pixel by performing a sum-of-products operation between non-zero values of the elements of said filter array and the values of input pixels of the input image located at respective positions, when the filter array is superimposed on the input image such that the center of said filter array corresponds to the location of said output pixel.

15. The device of claim 14, wherein said signal processor is configured to operate such that the effective width of said filter array depends on the density of white or black binary pixels within an input image.

16. The device of claim 14, wherein the effective width of said filter array depends on the density of white or black input pixels within a portion of further input image.

17. The device of claim 14, wherein said signal processor is configured to provide the value of a first output pixel is by using a first filter array having a first width, and the value of a second output pixel by using a second filter array having a second different width.

18. The device of claim 14 further comprising an image sensor configured to capture a binary input image.

19. The device of claim 18 wherein individual detectors of said binary image sensor are smaller than a minimum focal spot of said imaging optics.

20. The device of claim 18, wherein the data size of said binary input image is greater than or equal to 4 times the data size of said output image.

21. A device comprising:
means for determining a location of an output pixel with respect to an input image,
means for determining values of elements of a filter array such that the effective width of said filter array depends on an exposure state of a portion of an image, and
means for determining the value of said output pixel by performing a sum-of-products operation between non-zero values of the elements of said filter array and the values of input pixels of the input image located at respective positions, when the filter array is superimposed on the input image such that the center of said filter array corresponds to the location of said output pixel.

* * * * *